(12) United States Patent
Edwards et al.

(10) Patent No.: US 7,409,494 B2
(45) Date of Patent: Aug. 5, 2008

(54) EXTENSION OF WRITE ANYWHERE FILE SYSTEM LAYOUT

(75) Inventors: John K. Edwards, Sunnyvale, CA (US); Blake H. Lewis, Los Altos Hills, CA (US); Robert M. English, Menlo Park, CA (US); Eric Hamilton, Durham, NC (US); Peter F. Corbett, Lexington, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 289 days.

(21) Appl. No.: 10/836,817

(22) Filed: Apr. 30, 2004

(65) Prior Publication Data

US 2005/0246401 A1 Nov. 3, 2005

(51) Int. Cl.
G06F 12/00 (2006.01)

(52) U.S. Cl. .................. 711/114; 711/117; 711/170; 711/205; 711/206

(58) Field of Classification Search ................. 711/112, 711/113, 114, 170, 203, 202, 200–201, 117, 711/205, 206; 707/201–204, 1, 100, 205
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |

(Continued)

FOREIGN PATENT DOCUMENTS

| | | |
|---|---|---|
| WO | WO 89/10594 | 11/1989 |
| WO | WO 02/065275 A1 | 8/2002 |
| WO | WO 2004/015522 A2 | 2/2004 |
| WO | WO 2004015521 A3 | 2/2004 |

OTHER PUBLICATIONS

J. Smith, "Recovery From Transient Faults in Redundant Systems", IBM Technical Disclosure Bulletin, vol. 23, No. 4, Sep. 1980, pp. 1707-1709.*

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14th VLDB Conference, LA, CA 1988.

(Continued)

*Primary Examiner*—Pierre-Michel Bataille
(74) *Attorney, Agent, or Firm*—Cesari and McKenna, LLP

(57) ABSTRACT

A file system layout apportions an underlying physical volume into one or more virtual volumes (vvols) of a storage system. The underlying physical volume is an aggregate comprising one or more groups of disks, such as RAID groups, of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Notably, the block allocation structures of a vvol are sized to the vvol, and not to the underlying aggregate, to thereby allow operations that manage data served by the storage system (e.g., snapshot operations) to efficiently work over the vvols. The file system layout extends the file system layout of a conventional write anywhere file layout system implementation, yet maintains performance properties of the conventional implementation.

93 Claims, 7 Drawing Sheets

U.S. PATENT DOCUMENTS

| | | | |
|---|---|---|---|
| 4,837,675 A | 6/1989 | Bean et al. | |
| 4,843,541 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,916,608 A | 4/1990 | Shultz | |
| 4,989,206 A | 1/1991 | Dunphy, Jr. et al. | |
| 5,124,987 A | 6/1992 | Milligan et al. | |
| 5,129,088 A | 7/1992 | Auslander et al. | |
| RE34,100 E | 10/1992 | Hartness | |
| 5,155,835 A * | 10/1992 | Belsan | 711/114 |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,426,747 A | 6/1995 | Weinreb et al. | |
| 5,485,579 A | 1/1996 | Hitz et al. | |
| 5,511,177 A | 4/1996 | Kagimasa et al. | |
| 5,581,724 A | 12/1996 | Belsan et al. | |
| 5,634,096 A | 5/1997 | Baylor et al. | |
| 5,764,972 A | 6/1998 | Crouse et al. | |
| 5,802,366 A | 9/1998 | Row et al. | |
| 5,819,292 A | 10/1998 | Hitz et al. | |
| 5,828,876 A | 10/1998 | Fish et al. | |
| 5,870,734 A | 2/1999 | Kao | |
| 5,897,661 A | 4/1999 | Baranovsky et al. | |
| 5,907,672 A | 5/1999 | Matze et al. | |
| 5,918,229 A | 6/1999 | Davis et al. | |
| 5,931,918 A | 8/1999 | Row et al. | |
| 5,941,972 A | 8/1999 | Hoese et al. | |
| 5,944,789 A | 8/1999 | Tzelnic et al. | |
| 5,963,962 A | 10/1999 | Hitz et al. | |
| 6,038,570 A | 3/2000 | Hitz et al. | |
| 6,065,037 A | 5/2000 | Hitz et al. | |
| 6,081,879 A | 6/2000 | Arnott | |
| 6,173,293 B1 | 1/2001 | Thekkath et al. | |
| 6,173,374 B1 | 1/2001 | Heil et al. | |
| 6,185,655 B1 | 2/2001 | Peping | |
| 6,275,898 B1 | 8/2001 | DeKoning | |
| 6,289,356 B1 * | 9/2001 | Hitz et al. | 711/161 |
| 6,425,035 B2 | 7/2002 | Hoese et al. | |
| 6,526,478 B1 | 2/2003 | Kirby | |
| 6,542,930 B1 | 4/2003 | Auvenshine | |
| 6,606,690 B2 | 8/2003 | Padovano | |
| 6,618,798 B1 | 9/2003 | Burton et al. | |
| 6,636,879 B1 | 10/2003 | Doucette et al. | |
| 6,957,294 B1 * | 10/2005 | Saunders et al. | 711/114 |
| 7,024,427 B2 * | 4/2006 | Bobbitt et al. | 707/200 |
| 7,069,307 B1 * | 6/2006 | Lee et al. | 709/217 |
| 2002/0083037 A1 | 6/2002 | Lewis et al. | |
| 2002/0112022 A1 | 8/2002 | Kazar et al. | |
| 2002/0112113 A1 * | 8/2002 | Karpoff et al. | 711/4 |
| 2002/0116593 A1 | 8/2002 | Kazar et al. | |
| 2003/0093439 A1 | 5/2003 | Mogi et al. | |
| 2003/0195942 A1 | 10/2003 | Muhlestein et al. | |
| 2004/0054777 A1 * | 3/2004 | Ackaouy et al. | 709/225 |
| 2005/0120078 A1 * | 6/2005 | Kazar et al. | 709/203 |
| 2005/0192932 A1 * | 9/2005 | Kazar et al. | 707/1 |

OTHER PUBLICATIONS

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al., *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached Worm File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File Systems* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al., *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.
Administration Guide found at http://www.openafs.org/pages/doc/AdminGuide/auagd010.htm, visited on Mar. 2, 2005.
Basilico, et al., *Error Correction System Using "Shadow Memory,"* IBM Technical Disclosure Bulletin, May 1984, pp. 5792-5793.
Blasgen, M.W. et al., *System R:An architectural Overview*,Reprinted from IBM Systems Journal vol. 20, No. 1, 1981 © 1981, 1999.
Borenstein, Nathaniel S., *CMU's Andrew project a retrospective*, Communciations of ACM, (39)12, Dec. 1996.
Brown, Mark R. et al., *The Alpine file system*, ACM Transactions on Computing Systems, 3(4):261-293, Nov. 1985.
Chen, Peter M., et al., *An Evaluation of Redundant Arrays of Disks Using an Amdahl 5890* Performance Evaluation, pp. 74-85, 1990.
Clark, B.E., et al., *Application System /400 Performance Characteristics*, IBM Systems Journal, 28(3): 407-423, 1989.
Data Sheet for the Check Point Software Technologies product Flood-Gate-1 (1997).
Dibble, Peter C., et al., Beyond Striping: The Bridge Multiprocessor File System, Computer Science Department, University of Rochester, Aug. 11, 1989.
Douglis, Fred, et al., *A comparison of two distributed systems: Amoeba and Sprite*—Computing Systems, 4(4), Fall 1991, pp. 353 385 ?{copy of article I have has no date or cite}.
Gait, Jason, *Phoenix: A Safe In-Memory File System*. Communications of the ACM, 33(1):81-86, Jan. 1990.
Hartman, John H. et al., *Performance Measurements of a Multiprocessor Sprite Kernel*, Proceedings of the USENIX Conference, 1990.
Hitz, Dave et al., *File System Design for an NFS File Server Appliance*, Technical Report 3002, Rev. C395, presented Jan. 19, 1994.
Howard, John H, et al. Scale and Performance in a Distributed File System, Carnegie Mellon University, CMU-ITC-87-068, Aug. 5, 1987.
Howard, John H., *An Overview of the Andrew File System*, Carnegie Mellon University, CMU-ITC-88-062.
*The IBM System/38*, Chapter 8, pp. 137-15.
Isomaki, Markus, *Differentiated Service for the Internet*, Department of Technical Physics and Mathematics, May 9, 1998.
Lomet, David., et al., *The performance of a multiversion access method*, ACM SIGMOD International Conference on Management of Data, 19:353-363.
Lorie, Raymond, A, *Physical integrity in a large segmented database*, ACM Trans. Database Systems, (2)1: 91-104, Mar. 1977.
Lorie, RA, *Shadow Page Mechanism*, IBM Technical Disclosure Bulletin, Jun. 1986, pp. 340-342.
McKusick, Marshall Kirk, et al., *A Fast File System for UNIX*, Computer Science Division, Department of Electrical Engineering and Computer Sciences, Univ. of CA, Berkley, Feb. 18, 1994.
Miller, Ethan L., et al., *RAMA:A File System for Massively Parallel Computers*, 12th IEEE Symposium on Mass Storage Systems, Monterey CA, Apr. 1993, pp. 163-168.
Moons, Herman et al., *Location-Independent Object Invocation in Open Distributed Systems*, Autumn 1991 EurOpen Technical Conference and Exhibition, pp. 287-300 (Sep. 16-20, 1991).
Morris, James H., et al, *Andrew: A Distributed Personal Computing Environment*, Comm. of the ACM, vol. 29, Mar. 1986, pp. 184-201.
Mullender, Sape J., et al., *A distributed file service based on optimistic concurrency control*, ACM Symposium on Operating System Principles (Orcas Island, Washington). Published as Operating Systems Review, 19(5):51-62, Dec. 1985.
Muller, Keith, et al., *A High Performance Multi-Structured File System Design*, In Proceedings of the 13th ACM Symposium on Operating Systems Principles, Oct. 1991, pp. 56-67.
Ousterhout, John K. et al., *The Sprite Network Operating System*, Computer Science Division, Department of Electrical Engineering and Computer Sciences, Univ. of CA, Berkley, Nov. 19, 1987.
Ousterhout, John et al., *Beating the I/O Bottleneck: A Case for Long-Structured File Systems*, Technical Report, Computer Science Division, Electrical Engineering and Computer Sciences, University of California at Berkeley, Oct. 30, 1988.
Ousterhout, John, *Why Aren't Operating Systems Getting Faster as Fast as Hardware?*, Digital WRL Technical Note TN-11, Oct. 1989.
Ousterhout, John, *A Brief Retrospective On The Sprite Network Operating System*, found at http://www.cs.berkeley.edu/projects/sprite/retrospective.html. visited on Mar. 11, 2005.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).
Peterson, Zachary Nathaniel Joseph. *Data Placement for Copy-on-Write Using Virtual Contiguity*, University of CA, Santa Cruz, Master of Science in Computer Science Thesis, Sep. 2002.
Redundant Array of Independent Disks, from Wikipedia, the free encyclopedia, found at http://en.wikipedia.org/wiki/RAID, visited on Mar. 9, 2005.
Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.
Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.
Rosenblum, Mendel, et al, *The Design and Implementation of a Log-Structured File System* Jul. 24, 1991 pp. 1-15.
Sandberg, Russell et al., *Design and implementation of the Sun Network Filesystem*. In Proc. Summer 1985 USENIX Conf., pp. 119-130, Portland OR (USA), Jun. 1985.
Santry, Douglas S., et al., *Deciding When to Forget in the Elephant File System*, Operating Systems Review, 34(5), (Dec. 1999) pp. 110-123
Satyanarayanan, M., et al., *The ITC Distributed File System: Principles and Design*, In Proceedings of the 10th ACM Symposium on Operating Systems Principles, (19)5:56-67, Dec. 1985
Satyanarayanan,.M.. *A survey of distributed file-systems*. Annual Review of Computing Science, 4(73-104), 1989.
Satyanarayanan, M., et al, *Coda: A highly available file system for a distributed workstation environment* Carnegie Mellon University, CMU-ITC.
Satyanarayanan, M., et al, *Coda: A highly available file system for a distributed workstation environment*. IEEE Transactions on Computers, 39(4):447-459, 1990.
Satyanarayanan, Mahadev, *Scalable, Secure, and Highly Available Distributed File Access*, Computer May 1990: 9-21.
User Guide found at http://www.openafs.org/pages/doc/UserGuide/auusg004.htm, visited on Mar. 2, 2005.
Welch, Brent B., et al., *Pseudo Devices: User-Level Extensions to the Sprite File System*, Computer Science Division, Department of Electrical Engineering and Computer Sciences, Univ. of CA, Berkley, Apr. 1988.
Welch, Brent B., et al., *Pseudo-File-Systems*, Computer Science Division, Department of Electrical Engineering and Computer Sciences, Univ. of CA, Berkley, Oct. 1989.
Wittle, Mark, et al, *LADDIS: The next generation in NFS file server benchmarking*, USENIX Association Conference Proceedings, Apr. 1993.
U.S. Appl. No. 10/215,917, filed Aug. 9, 2002, Pawlowski et al.
U.S. Appl. No. 10/836,090, filed Apr. 30, 2004, Edwards.
David Patterson et al., A Case for Redundant Arrays of Inexpensive Disks (RAID), 1988, University of California.
Hypertext Transfer Protocol, RFC 2616, www.ietf.org, Jun. 1999.
Common Internet File System (CIFS), Storage Networking Industry Association, Mar. 26, 2001.
Hitz et al., File System Design for an NFS File Server Appliance, Network Appliance, Inc.
NFS Version 3 Protocol Specification, RFC 1813, www.ietf.org, Jun. 1995.
Yingping Lu and David H. C. Du, Performance Study of iSCSI-Based Storage Subsystems, Storage Area Networking, 2003.
Celerra File Server Architecture for High Availability, The Enterprise Storage Company, Aug. 1999.

Ron Levine and Michelle Gervais, Building a SAN, Storage Area Networks, SunExpert Magazine, Mar. 1999.

Unix Workstation System Administration Education Certification Course, Jan. 8, 2002.

Auspex Systems, LFS—A Local File System for Multiprocessor NFS Network Servers, 1994.

Maintenance Procedures ND (8C) nd-network disk control Feb. 1985.

Misc. Reference Manual Pages ND (4P) nd-network disk driver Jul. 26, 1985.

Asante EN/SC Adapter Family Installation Guide May 1994.

Asante Desktop EN/SC Adapters User's Manual Apr. 1996.

Performance Without Compromise: The Virtual Storage Architecture 1997.

"Network Appliance Ends NAS/SAN War" by Computerwire, http://www.theregister.co.uk/content/63/27368.html; posted on Feb. 10, 2002.

Chang-Soo Kim et al., "Volume Management in SAN Environment," Parallel and Distributed Systems, 2001. ICPADS 2001. Proceedings. Eighth International Conference on Jun. 26-29, 2001, Piscataway, NJ, IEEE, Jun. 26, 2001, pp. 500-505.

Roger Thomas, International Search Report for PCT/US2005/013695, Apr. 7, 2006.

* cited by examiner

EXTENSION OF WRITE ANYWHERE FILE SYSTEM LAYOUT

CROSS-REFERENCE TO RELATED APPLICATION

The present invention is related to the following commonly assigned U.S. patent application Ser. No. (112056-0154) titled, Extension of Write Anywhere File Layout Write Allocation, filed herewith.

FIELD OF THE INVENTION

The present invention relates to file systems and, more specifically, to a file system layout that is optimized for low-latency read performance and efficient data management operations.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n-1 blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

When accessing a block of a file in response to servicing a client request, the file system specifies a vbn that is translated at the file system/RAID system boundary into a disk block number (dbn) location on a particular disk (disk, dbn) within a RAID group of the physical volume. Each block in the vbn space and in the dbn space is typically fixed, e.g., 4 k bytes (kB), in size; accordingly, there is typically a one-to-one mapping between the information stored on the disks in the dbn space and the information organized by the file system in the vbn space. The (disk, dbn) location specified by the RAID system is further translated by a disk driver system of the storage operating system into a plurality of sectors (e.g., a 4 kB block with a RAID header translates to 8 or 9 disk sectors of 512 or 520 bytes) on the specified disk.

The requested block is then retrieved from disk and stored in a buffer cache of the memory as part of a buffer tree of the file. The buffer tree is an internal representation of blocks for a file stored in the buffer cache and maintained by the file system. Broadly stated, the buffer tree has an inode at the root (top-level) of the file. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a vbn to facilitate efficiency among the file system and the RAID system when accessing the data on disks.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk,dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume.

Specifically, the snapmap denotes a file including a bitmap associated with the vacancy of blocks of a snapshot. The write-anywhere file system (such as the WAFL file system) has the capability to generate a snapshot of its active file system. An "active file system" is a file system to which data can be both written and read or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports multiple snapshots that are generally created on a regular schedule. Each snapshot refers to a copy of the file system that diverges from the active file system over time as the active file system is modified. In the case of the WAFL file system, the active file system diverges from the snapshots since the snapshots stay in place as the active file system is written to new disk locations. Each snapshot is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various snapshots require extra storage blocks. The multiple snapshots of a storage element are not independent copies, each consuming disk space; therefore, creation of a snapshot on the file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL file system, snapshots are described in *TR3002 File System Design for a NFS File Server Appliance* by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though full set forth herein.

The active map denotes a file including a bitmap associated with a free status of the active file system. As noted, a logical volume may be associated with a file system; the term "active file system" refers to a consistent state of a current file system. The summary map denotes a file including an inclusive logical OR bitmap of all snapmaps. By examining the active and summary maps, the file system can determine whether a block is in use by either the active file system or any snapshot. The space map denotes a file including an array of numbers that describe the number of storage blocks used (counts of bits in ranges) in a block allocation area. In other words, the space map is essentially a logical OR bitmap between the active and summary maps to provide a condensed version of available "free block" areas within the vbn space. Examples of snapshot and block allocation data structures, such as the active map, space map and summary map, are described in U.S. Patent Application Publication No. U.S. 2002/0083037 A1, titled Instant Snapshot, by Blake Lewis et al. and published on Jun. 27, 2002, which application is hereby incorporated by reference.

The write-anywhere file system typically performs write allocation of blocks in a logical volume in response to an event in the file system (e.g., dirtying of the blocks in a file). When write allocating, the file system uses the block allocation data structures to select free blocks within its vbn space to which to write the dirty blocks. The selected blocks are generally in the same positions along the disks for each RAID group (i.e., within a stripe) so as to optimize use of the parity disks. Stripes of positional blocks may vary among other RAID groups to, e.g., allow overlapping of parity update operations. When write allocating, the file system traverses a small portion of each disk (corresponding to a few blocks in depth within each disk) to essentially "lay down" a plurality of stripes per RAID group. In particular, the file system chooses vbns that are on the same stripe per RAID group during write allocation using the vbn-to-disk,dbn mappings.

As disks increase in size, the logical volume may also increase, resulting in more storage space than a user (client) may need in a single managed logical unit of storage. This presents the client with a choice of either combining multiple data sets onto the large disks of the logical volume and creating resulting management issues or placing discrete data sets on a small number of disks (thus creating a "small" logical volume) and accepting reduced performance. The small logical volume approach suffers reduced performance because, among other things, the use of few disks to store data results in high parity overhead.

A conventional solution to this problem is to "hard" partition the disks of the storage system, e.g., construct a RAID group from the disks, divide the RAID group into horizontal "slices" and dispose a logical volume (file system) on each slice. This solution provides a user with many logical volumes over many disks and the flexibility to size the volumes as needed. Yet, this solution is inflexible with respect to changing the storage space (per file system) among the volumes once the disks are hard partitioned. Hard partitioning denotes apportioning free storage space among the logical volumes; often the available free storage space is not in the intended volume and, as a result, it is difficult and costly to move the free space (i.e., change such partitioning) where it is needed.

Another solution involves organizing a logical volume into smaller data management entities called "qtrees". A qtree is a special type of directory that acts as a "soft" partition, i.e., the storage used by the qtrees is not limited by space boundaries. In this context, the qtree functions as a form of space virtualization that decouples physical disk limitations and underlying structure from a logical data management entity. Files in a qtree are tagged as belonging to that qtree and, as such, the files cannot be moved between qtrees. Yet qtrees share all of the disks of the logical volume and, thus, have access to all free space within the volume. A qtree may have a quota, which is an "accounting-like" feature that limits the number of blocks that a qtree can "own". However, the limited blocks can be anywhere within the logical volume. Data is written out to disks, arbitrarily, to free block locations of the qtrees. There is no hard partition, just a soft accounting-like partition.

Since qtrees are data management entities smaller than a logical volume, clients typically use qtrees extensively and build features based on them. For example, a client may use a qtree to store a database. However, a disadvantage of a qtree is that it resides in a logical volume and certain features of the write-anywhere file layout system, particularly snapshot operation functionality, are logical volume attributes. Thus, when a client creates a snapshot of a database in a qtree (via a snapcreate operation), it must create a snapshot of all qtrees in the volume. Similarly, if the client snap restores the database in the qtree (via a snaprestore operation), it must snap restore all qtrees in the volume. Although qtrees allow access to all free space within a logical volume, that flexibility is reduced by the constraint to volume-level granularity features, such as snapcreate and snaprestore operations.

Yet another solution to the increasing disk size problem is a naïve "nested volumes" approach that involves building logical volumes within files of an underlying logical volume. This approach tends to introduce an extra layer of indirection in a read latency path of the storage system. Also, a typical implementation of this solution would not allow free space to be returned to the underlying logical volume; as a result, this solution suffers from the same management issues as a hard partitioning solution.

Therefore, it is desirable to provide a write-anywhere file layout system that merges properties of logical volumes and qtrees.

It is also desirable to provide a write-anywhere file layout system that merges a rich feature set of logical volumes with the space virtualization of qtrees.

SUMMARY OF THE INVENTION

The present invention overcomes the disadvantages of the prior art by providing a novel file system layout that apportions an underlying physical volume into one or more virtual volumes (vvols) of a storage system. The underlying physical volume is an aggregate comprising one or more groups of disks, such as RAID groups, of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Notably, the block allocation structures of a vvol are sized to the vvol, and not to the underlying aggregate, to thereby allow operations that manage data served by the storage system (e.g., snapshot operations) to efficiently work over the vvols. The novel file system layout extends the file system layout of a conventional write anywhere file layout system implementation, yet maintains performance properties of the conventional implementation.

Specifically, the extended file system layout facilitates efficient read performance on read paths of files contained in a vvol by utilizing pvbns as block pointers within buffer trees of the files. The use of pvbns avoids latency associated with translations from vvbns-to-pvbns, e.g., when servicing file system (such as NFS, CIFS) requests. In addition, less "work" is needed at the vvol level when performing data management operations because of the use of relatively small block allocation structures (sized to the vvbn space of the vvol) rather than the relatively large block allocation structures used at the aggregate level.

In accordance with an aspect of the present invention, each vvol is a file system that may be associated with a novel container file. Each vvol has its own logical properties, such as snapshot operation functionality, while utilizing existing algorithms of the conventional file system layout implementation; an exception involves a free block in the container file that is returned to the aggregate. In particular, free space is not partitioned among the multiple vvols of the aggregate; the free storage space is owned by the aggregate. This aspect of the present invention is notable because free space is a key determinant of write allocation efficiency. Since free space is not held by a vvol and the size of the vvol is the number of blocks it can use, not the size of the container file, the present invention also allows for flexible sizing, including "over-committing" and "sparse provisioning".

Another aspect of the present invention involves linking of a vvbn space for each vvol to an overall, underlying pvbn space of the aggregate. Here, the vvbn space of a vvol is used for efficient data management operations at the vvol granularity, while the pvbn space is used for read data path performance of buffer trees for files of the vvols. This latter aspect of the invention utilizes a container map per vvol and an owner map of the aggregate. The container map provides a "forward mapping" of vvbns of a vvol to pvbns of the aggregate, whereas the owner map provides a "backward mapping" between the pvbns and vvbns.

Advantageously, the extended file system layout assembles a group of disks into an aggregate having a large, underlying storage space and flexibly allocates that space among the vvols. To that extent, the vvols have behaviors that are similar to those of qtrees, including access to all free block space within the aggregate without space boundary limitations. Sizing of a vvol is flexible, avoiding partitioning of storage space and any resulting problems. The present invention provides substantial performance advantages of a naïve nested volumes implementation, particularly as optimized for low-latency read performance.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
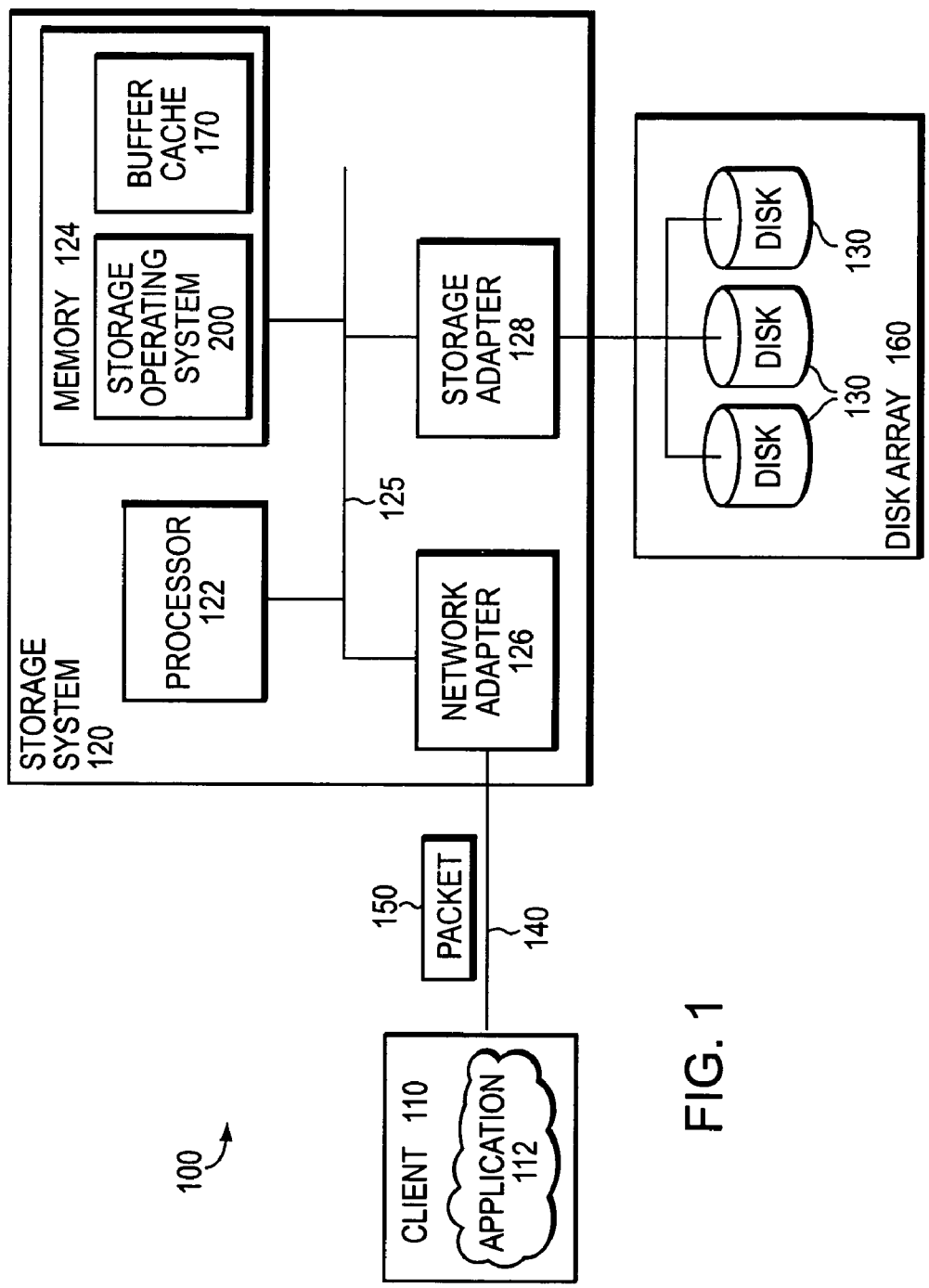
FIG. 1 is a schematic block diagram of an environment including a storage system that may be advantageously used with the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "ondisk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp™ Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 2:
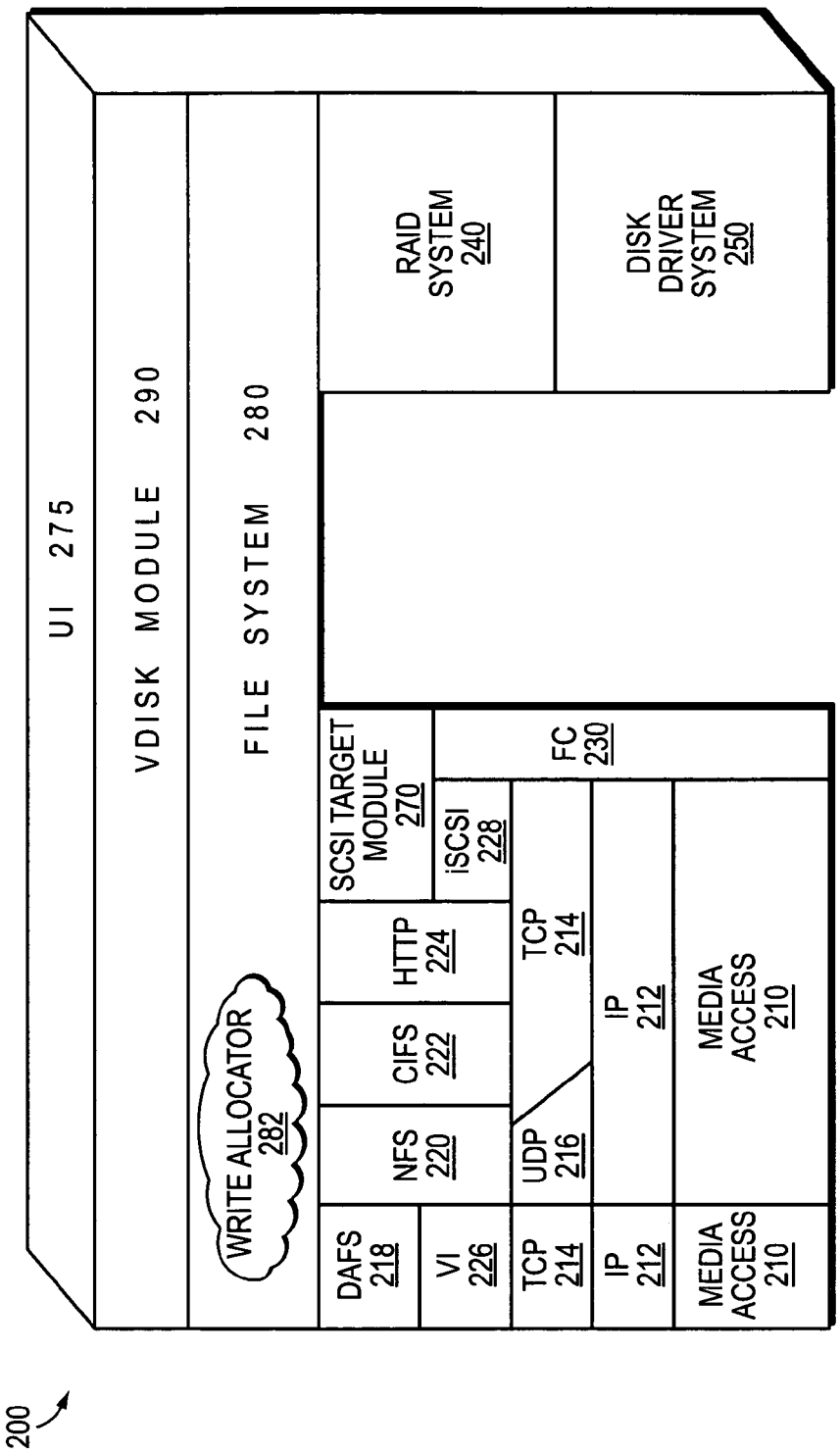
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in U.S. patent application Ser. No. 10/215,917 titled, Multi-Protocol Storage Appliance that provides Integrated Support for File and Block Access Protocols, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
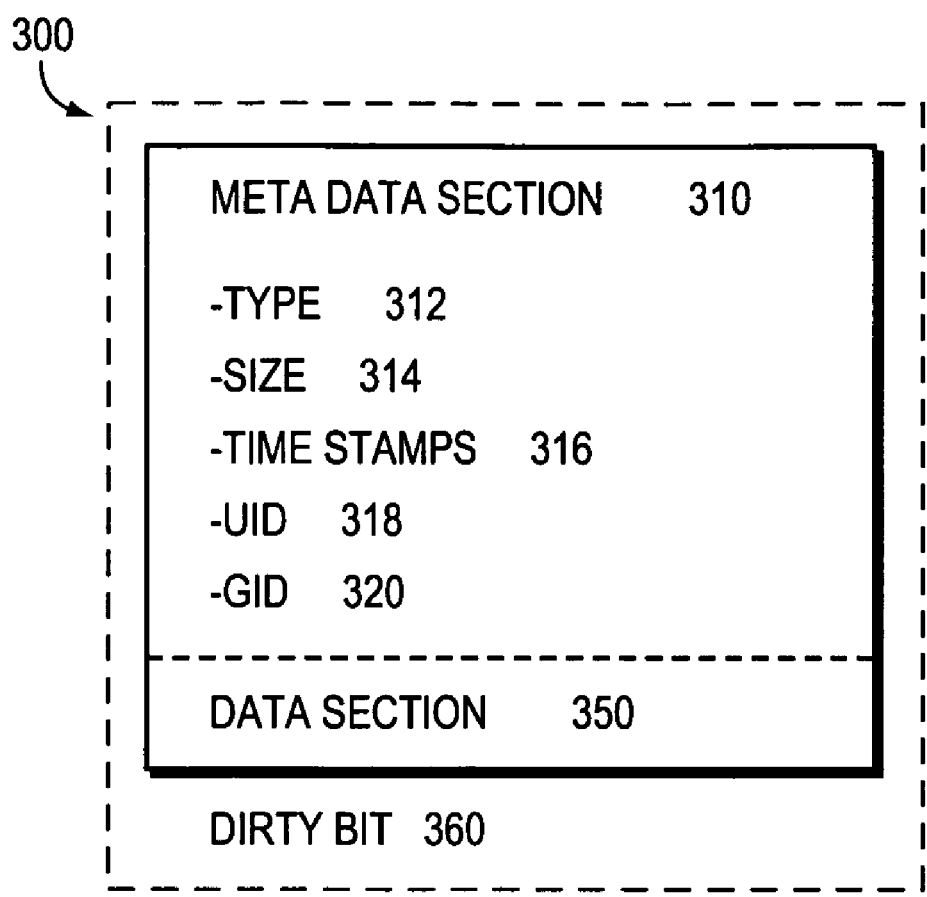
FIG. 3 is a schematic block diagram of an inode that may be advantageously used with the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 kB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 350 of the inode (e.g., a second level inode) references an indirect block (e.g., a first level block) that contains 1024 pointers, each of which references a 4 kB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 kB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled Method for Maintaining Consistent States of a File System and for Creating User-Accessible Read-Only Copies of a File System by David Hitz et al., issued on Oct. 6, 1998.

Figure 4:
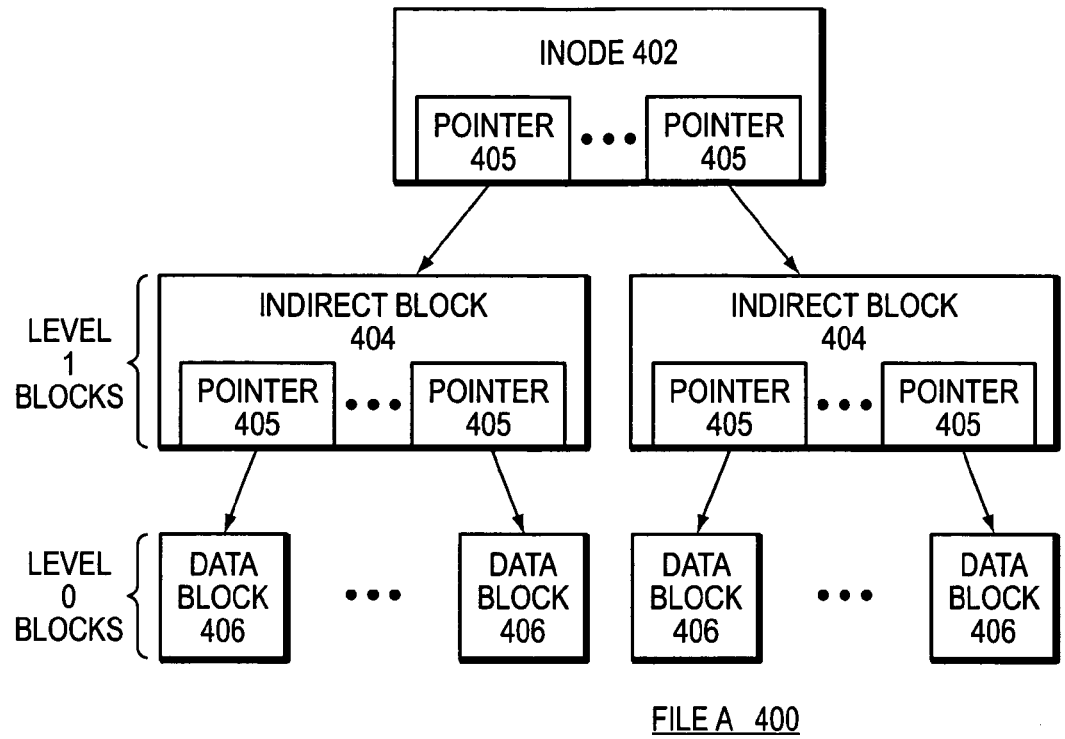
FIG. 4 is a schematic block diagram of a buffer tree of a file that may be advantageously used with the present invention.

FIG. 4 is a schematic block diagram of a buffer tree of a file that may be advantageously used with the present invention. The buffer tree is an internal representation of blocks for a file (e.g., file A 400) loaded into the buffer cache 170 and maintained by the write-anywhere file system 280. A root (top-level) inode 402, such as an embedded inode, references indirect (e.g., level 1) blocks 404. The indirect blocks (and inode) contain pointers 405 that ultimately reference data blocks 406 used to store the actual data of file A. That is, the data of file A 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

Figure 5:
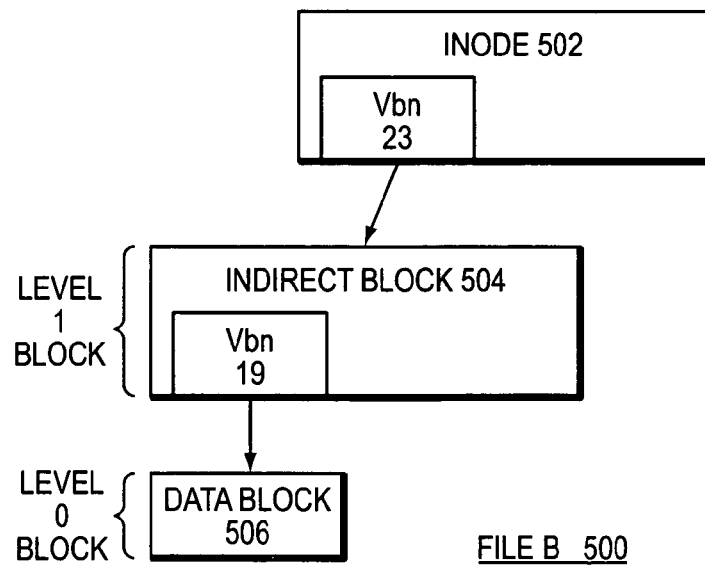
FIG. 5 is a schematic block diagram of a partial buffer tree of a large file inside the file of FIG. 4.

As noted, the size of a logical volume generally increases as disks increase in size, resulting in more storage space than a client may need in a single managed logical unit of storage. A solution to this increasing disk size problem is a naïve "nested volumes" approach that involves building logical volumes within files of an underlying logical volume, i.e., a "pure" logical (file system) volume stored in a file. FIG. 5 is a schematic block diagram of a partial buffer tree of a large file (e.g., file B 500) that resides inside a file (e.g., file A 400) containing a logical volume. All indirect blocks in the file B utilize vbns as block pointers. For example, block pointer vbn 23 in inode 502 indicates that "child" indirect block 504 is at vbn 23 and block pointer vbn 19 in indirect block 504 indicates that level 0 block 506 is at vbn 19. However, because file B 500 is inside another file (file A 400) containing a logical volume, vbn 23 is not a location on disk but rather is a location in file A 400. Therefore, the write-anywhere file system searches for vbn 23 in file A 400 in order to access the correct indirect block.

Assume that the file system 280 attempts to read level 0 block 506 from file B 500. The file system traverses the buffer tree of file B and locates the level 0 block 506. For a logical volume inside of a file, the location of a level 0 block is a location within the file. That is, the location of level 0 block 506 of file B 500 is a location within the file A 400. Therefore, to find the actual data in the level 0 block 506 in the buffer tree of file B, the file system must traverse the buffer tree of file A. This results in having to traverse two buffer trees of files in order to access the correct blocks, which causes inefficient overhead (latency) for read operations. In particular, this approach introduces an extra layer of indirection in a read latency path of the storage system.

However, an advantage of this "pure" logical volume approach includes the ability to exploit various file system features for a logical volume inside of a file containing a logical volume. For instance, the file system accesses block allocation (bitmap) structures, such as active and summary maps, when creating a snapshot of a logical volume. The bit maps are sized to the size of the logical volume; thus a large volume requires large bit maps, which results in large overhead when performing snapshot operations, such as snapdelete (to remove a snapshot) or snapcreate. For a logical volume inside a file containing a logical volume, the file may be "small" and the vbn space (hereinafter a "virtual" vbn space) of the file (hereinafter a "virtual" volume) is sized to the file. Therefore, the virtual vbn (vvbn) space is much smaller and the cost of taking a snapshot of the virtual volume (vvol) is much smaller. The present invention is directed to a variant of this "nesting" approach.

The pure logical volume in a file approach creates a "hidden" file within a physical volume, wherein the hidden file contains the logical volume. As noted, the RAID system 240 organizes the RAID groups of the disks as a physical volume. When the file system retrieves a vbn (e.g., vbn X), it uses disk geometry information provided by the RAID system to translate that vbn into a disk,dbn location on disk. When operating in a vvol, a vvbn identifies a file block number (fbn) location within the file and the file system uses the indirect blocks of the hidden (container) file to translate the fbn into a physical vbn (pvbn) location within the physical volume, which block can then be retrieved from disk using the geometry supplied by the RAID system. The logical volume contained within the hidden file holds all conventional file system metadata files for the volume. Block allocation bitmaps of the vvol indicate whether the block location in the hidden file is in use by the contained logical volume. Indirect blocks of files within the vvol, including those embedded in inode file blocks, contain vvbns. As described further herein, the indirect blocks of the hidden (container) file effectively amount to an indirection layer, translating vvbns-to-pvbns in the aggregate.

The present invention is directed to a novel file system layout that apportions an underlying physical volume into one or more vvols of a storage system. The underlying physical volume is an aggregate comprising one or more groups of disks, such as RAID groups, of the storage system. The aggregate has its own pvbn space and maintains metadata, such as block allocation structures, within that pvbn space. Each vvol also has its own vvbn space and maintains metadata, such as block allocation structures, within that vvbn space. Notably, the block allocation structures of a vvol are sized to the vvol, and not to the underlying aggregate, to thereby allow operations that manage data served by the storage system (e.g. snapshot operations) to efficiently work over the vvols. The novel file system layout extends the file system layout of a conventional write anywhere file layout (e.g., WAFL) system implementation, yet maintains performance properties of the conventional implementation.

Figure 6:
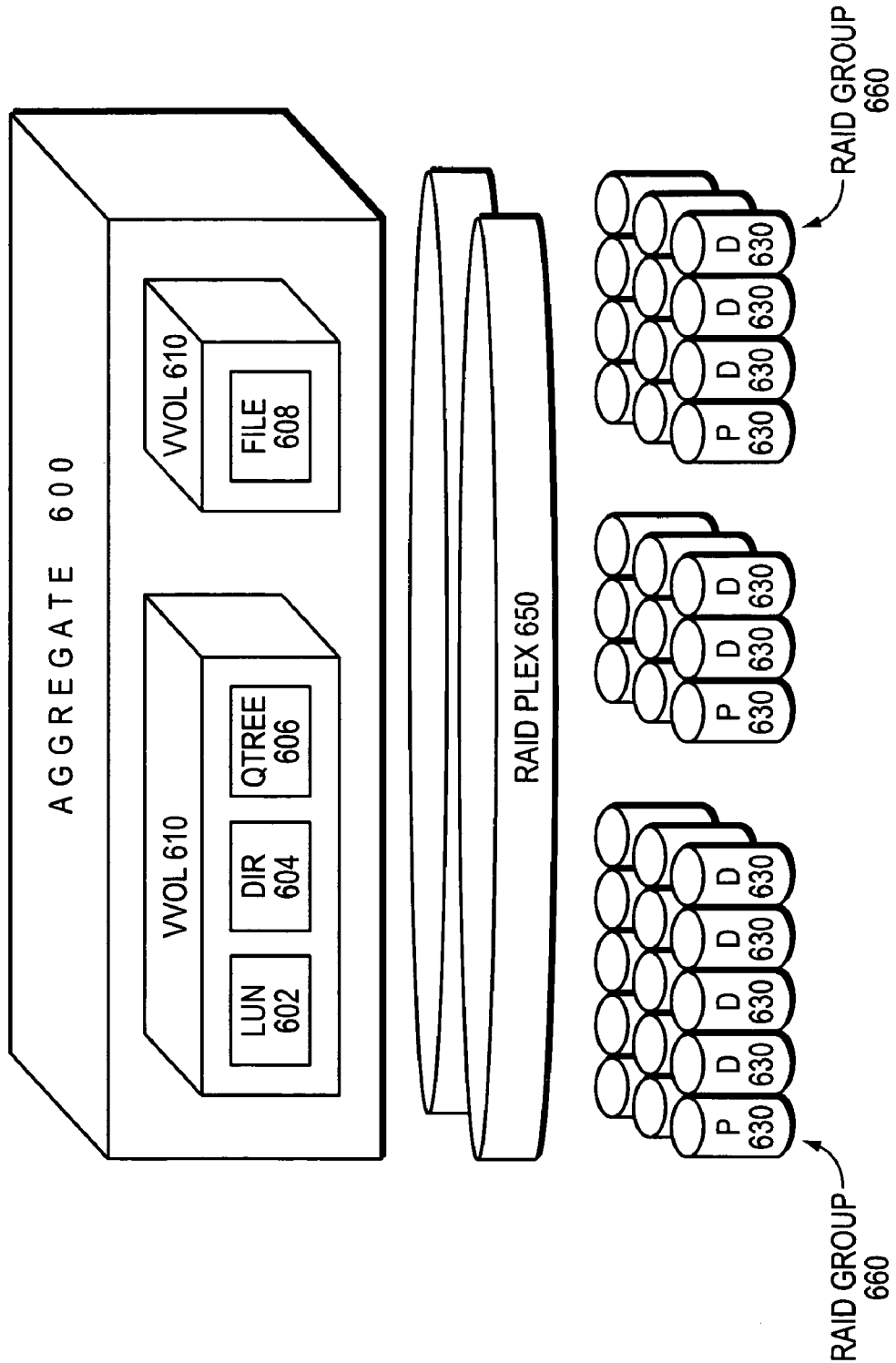
FIG. 6 is a schematic block diagram of an embodiment of an aggregate in accordance with the present invention.

FIG. 6 is a schematic block diagram of an embodiment of an aggregate 600 in accordance with the present invention. Luns (blocks) 602, directories 604, qtrees 606 and files 608 may be contained within vvols 610 that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a vvol is analogous to a file within that physical volume. That is, the aggregate 600 may include one or more files, wherein each file contains a vvol 610 and wherein the sum of the storage space consumed by the vvols is physically smaller than (or equal to) the size of the overall physical volume, i.e., the vvol must use fewer blocks than the aggregate has, but need not have a smaller vbn space. The aggregate utilizes a "physical" pvbn space that defines a storage space of blocks provided by the disks of the physical volume, while each embedded vvol (within a file) utilizes a "logical" vvbn space to organize those blocks, e.g., as files. Each vvbn space is an independent set of numbers that corresponds to locations within the file, which locations are then translated to dbns on disks. Since the vvol 610 is also a logical volume, it has its own block allocation structures (e.g., active, space and summary maps) in its vvbn space.

A snapshot can thus be created on a vvol granularity using the vvol's block allocation bitmaps, which are sized to the vvbn space. Creating a snapshot denotes that certain blocks cannot be overwritten; i.e., block locations in the container file cannot be overwritten. Those snapshotted blocks are thus "frozen" and the bitmaps within the vvol that govern overwriting of block locations freeze ("hold down") those locations in the file (i.e., freeze locations in vvbn space that the vvol cannot reuse). This also freezes the physical blocks or pvbns that correspond to those, and only those, vvbns. Substantially all functions/features that can be performed on a logical volume, including any snapshot operation, can also be performed on the vvol. Notably, since the vvbn space may be much smaller than the pvbn space, the cost of a snapshot operation is advantageously sized to the vvol granularity.

Each vvol 610 may be a separate file system that is "mingled" onto a common set of storage in the aggregate 600 by the storage operating system 200. The RAID system 240 builds a raid topology structure for the aggregate that guides each file system when performing write allocation. The RAID system also presents a pvbn-to-disk,dbn mapping to the file system. A vvol 610 only uses the storage space of the aggregate 600 when it has data to store; accordingly, the size of a vvol can be overcommitted. Space reservation policies ensure that the entire storage space of a vvol is available to a client of the vvol when overcommitment is not desired. The overcommitted aspect is a feature of the aggregate that results in improved storage efficiency.

According to an aspect of the extended file system layout, pvbns are used as block pointers within buffer trees of files stored in a vvol. By utilizing pbvns (instead of vvbns) as block pointers within buffer trees of the files (such as file B 500), the extended file system layout facilitates efficient read performance on read paths of those files. That is, the use of pvbns avoids latency associated with translations from vvbns-to-pvbns, e.g., when servicing file system (such as NFS, CIFS) requests. On a read path of a logical volume, a volume (vol) info block has a pointer that references an fsinfo block that, in turn, "points to" an inode file and its corresponding buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk,dbn occurs at the file system/RAID system boundary of the storage operating system 200.

A container file is a file in the aggregate that contains all blocks used by a vvol. The container file is an internal (to the aggregate) feature that supports a vvol; illustratively, there is one container file per vvol. Similar to the pure logical volume in a file approach, the container file is a hidden file (not accessible to a user) in the aggregate that holds every block in use by the vvol. According to another aspect of the invention, the aggregate includes an illustrative hidden metadata root directory that contains subdirectories of vvols:

WAFL/fsid/Filesystem File, Storage Label File

Specifically, a "physical" file system (WAFL) directory includes a subdirectory for each vvol in the aggregate, with the name of subdirectory being a file system identifier (fsid) of the vvol. Each fsid subdirectory (vvol) contains at least two files, a filesystem file and a storage label file. The storage label file is illustratively a 4 kB file that contains metadata similar to that stored in a conventional raid label. In other words, the storage label file is the analog of a raid label and, as such, contains information about the state of the vvol such as, e.g., the name of the vvol, a universal unique identifier (uuid) and fsid of the vvol, whether it is online, being created or being destroyed, etc.

Figure 7:
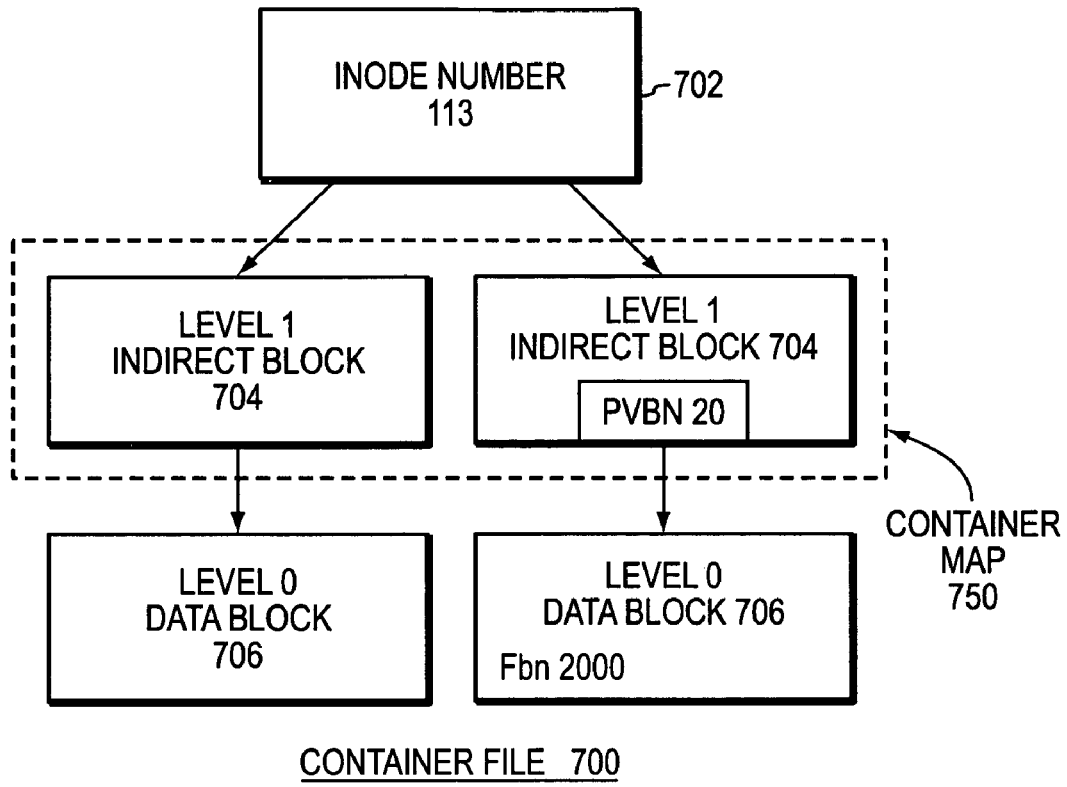
FIG. 7 is a schematic block diagram of a container file of the present invention.

The filesystem file is a large sparse file that contains all blocks owned by a vvol and, as such, is referred to as the container file for the vvol. FIG. 7 is a schematic block diagram of a container file 700 (buffer tree) in accordance with the present invention. The container file 700 is assigned a new type and has an inode 702 that is assigned an inode number equal to a virtual volume id (vvid) of the vvol, e.g., container file 700 has an inode number 113. The container file is essentially one large, sparse virtual disk and, since it contains all blocks owned by its vvol, a block with vvbn X in the vvol can be found at fbn X in the container file. For example, vvbn 2000 in a vvol can be found at fbn 2000 in its container file 700. Since each vvol has its own distinct vvbn space, another container file has fbn 2000 that is different from fbn 2000 in the illustrative container file 700.

Assume that a level 0 block 706 of the container file 700 has an fbn 2000 and a "parent" indirect (level 1) block 704 of the level 0 block 706 has a block pointer referencing the level 0 block, wherein the block pointer has a pvbn 20. Thus, location fbn 2000 of the container file 700 is pvbn 20 (on disk). Notably, the block numbers are maintained at the first indirect level (level 1) of the container file 700; e.g., to locate block 2000 in the container file, the file system layer accesses the $2000^{th}$ entry at level 1 of the container file and that indirect block provides the pvbn 20 for fbn 2000.

In other words, level 1 indirect blocks of the container file contain the pvbns for blocks in the file and, thus, "map" vvbns-to-pvbns of the aggregate. According to another aspect of the invention, the level 1 indirect blocks of the container file 700 are configured as a "container map" 750 for the vvol; there is preferably one container map 750 per vvol. Specifically, the container map provides block pointers from fbn locations within the container file to pvbn locations on disk. Furthermore, there is a one-to-one correspondence between fbn locations in the container file and vvbn locations in a vvol; this allows applications that need to access the vvol to find blocks on disk via the vvbn space.

As noted, each vvol has its own vvbn space that contains its own version of all file system metadata files, including block allocation (bitmap) structures that are sized to that space. Less work is thus needed at the vvol level when performing data management operations because of the use of relatively small block allocation structures (sized to the vvbn space of the vvol) rather than the relatively large block allocation structures used at the aggregate level. As also noted, the indirect blocks of files within a vvol contain pvbns in the underlying aggregate rather than vvbns, as described in the illustrative embodiment. This removes the indirection from the read path, resulting in some complexity in image transfers and write allocation, but improving the performance of the read path.

For example, when updating/modifying data (i.e., "dirtying") of an "old" block in a file during write allocation, the file system selects a new block and frees the old block, which involves clearing bits of the block allocation bitmaps for the old block in the logical volume's vbn (now pvbn) space. In essence, the file system 280 only knows that a particular physical block (pvbn) has been dirtied. However, freeing blocks within the vvol requires use of a vvbn to clear the appropriate bits in the vvbn-oriented block allocation files. Therefore, in the absence of a vvbn, a "backward" mapping (pvbn-to-vvbn) mechanism is needed at the aggregate level.

Figure 8:
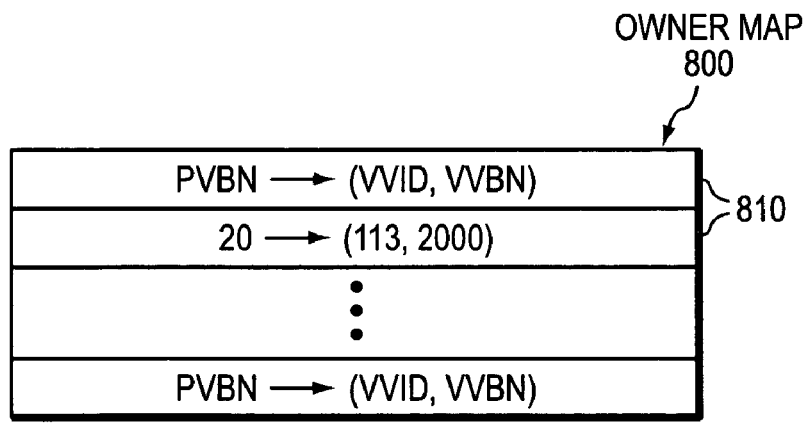
FIG. 8 is a schematic block diagram of an owner map of the present invention.

In accordance with another aspect of the invention, novel mapping metadata provides a backward mapping between each pvbn in the aggregate to (i) a vvid that "owns" the pvbn and (ii) the vvbn of the vvol in which the pvbn is located. The backward mapping metadata is preferably sized to the pvbn space of the aggregate; this does not present a scalability concern, since the mapping metadata for each of vvol can be interleaved into a single file, referred to as an owner map, in the aggregate. FIG. 8 is a schematic block diagram of an owner map 800 in accordance with the present invention. The owner map 800 may be embodied as a data structure having a plurality of entries 810; there is preferably one entry 810 for each block in the aggregate.

In the illustrative embodiment, each entry 810 has a 4-byte vvol id (vvid) and a 4-byte vvbn, and is indexed by a pvbn. That is, for a given block in the aggregate, the owner entry 810 indicates which vvol owns the block and which pvbn it maps to in the vvbn space, e.g., owner entry 810 indexed at pvbn 20 has contents vvid 113 and vvbn 2000. Thus when indexing into the owner map 800 at pvbn 20, the file system 280 accesses a vvol having an inode 113 (which is container file 700) and then accesses block location 2000 within that file. Each entry 810 of the owner map 800 is only valid for blocks that are in use; therefore, updates to the owner map are optimized to occur at a write allocation point. In general, a vvol only owns those blocks used in the contained file system. There may be situations where the vvol owns blocks the contained file system is not using. Allocated blocks that are not owned by any vvol illustratively have owner map entries (0, 0).

According to the extended file system layout, the owner map 800 provides a backward mapping between pvbn-to-vvbn (and vvid), while the container map 750 provides a "forward" mapping of vvbn-to-pvbn. Within the context of the present invention, it is always true that if vvbn X in the container map 750 for vvol V is pvbn Y, then entry Y in the owner map 800 is (V, X). Similarly if block Y is allocated in the aggregate and the owner map entry is (V, X), then entry X in the container map 750 for V has a value Y. The fact that the vvid is the inode number of the container file 700 and that the container file is a special type facilitates consistency checking between the owner map and the container file.

Illustratively, there is one owner map 800 per aggregate 600, wherein the owner map 800 may be configured to provided a simple mapping of (pvbn-to-vvbn) or a more elaborate (pvbn-to-vvol,vvbn). In the former case, the size of the owner map amounts to approximately 0.1% of the file system (i.e., size of a conventional block map), whereas in the latter case, the owner map size is twice that amount. However, the additional information contained in the latter case is useful in various applications such as, e.g., file system checking and cloning operations. A pvbn is owned by only one vvol and, in some situations, is not owned by any vvol (and thus owned by the aggregate). Entries 810 of the owner map 800 are only maintained for pvbn blocks that are allocated in the aggregate 600. Thus, for each entry 810 in the owner map 800, the file system 280 can locate the container file 700 defined by the vvid and locate the fbn of the file (corresponding to the vvbn of the entry) and the resulting block is the pvbn (on disk).

Figure 9:
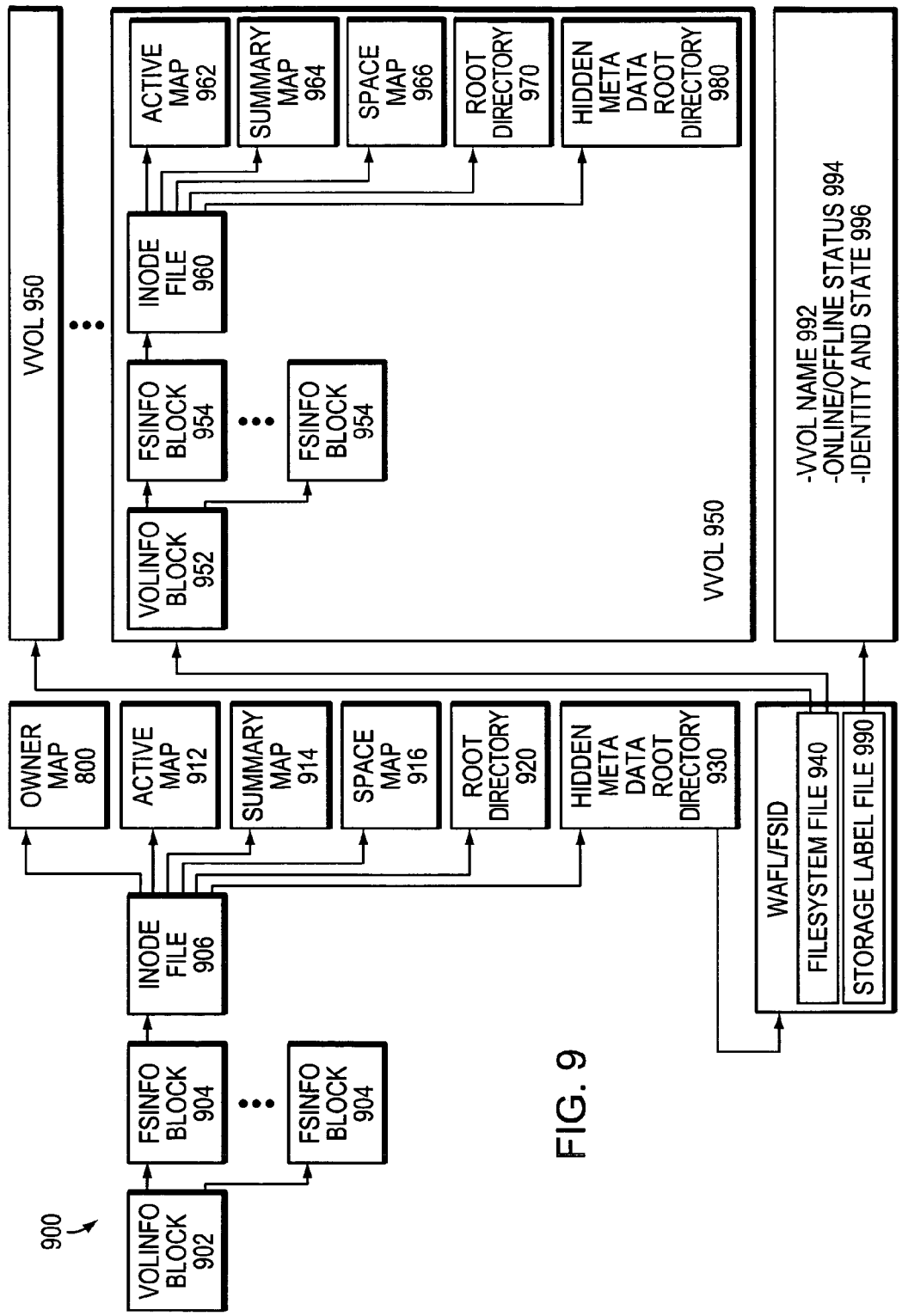
FIG. 9 is a schematic block diagram of an on-disk representation of an aggregate in accordance with the present invention.

FIG. 9 is a schematic block diagram of an on-disk representation of an aggregate 900 in accordance with the present invention. The storage operating system 200, e.g., the RAID system 240, assembles a physical volume of pvbns to create the aggregate 900, with pvbns 1 and 2 comprising a volinfo block 902 for the aggregate. The volinfo block 902 contains block pointers to fsinfo blocks 904, each of which may represent a snapshot of the aggregate. Each fsinfo block 904 includes a block pointer to an inode file 906 that contains inodes of a plurality of files, including an owner map 800, an active map 912, a summary map 914 and a space map 916, as well as other special metadata files. The inode file 906 further includes a root directory 920 and a "hidden" metadata root directory 930, the latter of which includes a namespace having files related to a vvol in which users cannot "see" the files. The hidden metadata root directory also includes the WAFL/fsid/directory structure, as previously described, which contains a filesystem file 940 and storage label file 990. Note that root directory 920 in the aggregate is empty; all files related to the aggregate are organized within the hidden metadata root directory 930. This is different from a conventional logical volume where the locations of all files in the volume are organized under the root directory.

In addition to being embodied as a container file having level 1 blocks organized as a container map, the filesystem file 940 includes block pointers that reference various file systems embodied as vvols 950. The aggregate 900 maintains these vvols 950 at special reserved inode numbers. Each vvol 950 also has special reserved inode numbers within its vvol space that are used for, among other things, the block allocation bitmap structures. As noted, the block allocation bitmap structures, e.g., active map 962, summary map 964 and space map 966, are located in each vvol.

Specifically, each vvol 950 has the same inode file structure/content as the aggregate, with the exception that there is no owner map and no WAFL/fsid/filesystem file, storage labelfile directory structure in a hidden metadata root directory 980. To that end, each vvol 950 has a volinfo block 952 that points to one or more fsinfo blocks 954, each of which may represent a snapshot of the vvol. Each fsinfo block, in turn, points to an inode file 960 that, as noted, has the same inode structure/content as the aggregate with the exceptions noted above. Notably, each vvol 950 has its own inode file 960 and distinct inode space with corresponding inode numbers, as well as its own root (fsid) directory 970 and subdirectories of files that can be exported separately from other vvols.

The storage label file 990 contained within the hidden metadata root directory 930 of the aggregate is a small file that functions as an analog to a conventional raid label. A raid label includes "physical" information about the storage system, such as the volume name; that information is loaded into the storage label file 990. Illustratively, the storage label file 990 includes the name 992 of the associated vvol 950, the online/offline status 994 of the vvol, and other identity and state information 996 of the associated vvol (whether it is in the process of being created or destroyed).

Management of the aggregate 900 is simplified through the use of the UI 275 of the storage operating system 200 and a novel aggregate ("aggr") and vvol ("vol") command set available to a user/system administrator. The UI 275 illustratively implements the vol command to create a vvol and perform other logical-related functions/actions in the storage system 100. For instance, a resize option of the vol command set may be used to exploit a property of the extended file system layout that enables "growing" of a vvol (file) using available disk space in the aggregate. Growing of a vvol only uses a small amount of additional metadata in the aggregate that essentially involves increasing the number of blocks that the vvol is allowed to use if necessary, along with increasing any volume level space guarantee or reservation. In addition, the resize command option may be used to reduce the size of a vvol and return any free blocks to the aggregate. In general, free blocks are rapidly returned to the aggregate; accordingly, size reduction does not generally return free blocks, but rather reduces the number of blocks that the vvol is allowed to use and, in the presence of a reservation, reduces the reservation charged to the aggregate for the vvol. Thus, the container file of the vvol remains the same size but uses fewer blocks.

Furthermore, the aggr command is implemented to perform physical (RAID)-related functions/actions, such as adding disks to an aggregate, mirroring an aggregate and mounting an aggregate. For example, an aggregate may be mounted in response to a mount command. When mounting the aggregate, all contained vvols that are online are also mounted. Likewise, unmounting of an aggregate unmounts all vvols, automatically. Options to the mount command are provided to mount an aggregate and unmount the contained vvols. This is useful for maintenance purposes.

In response to the mount aggregate command, the storage operating system, e.g., the file system 280, scans for vvols 950 and reads their storage label files 990, which provide information on all names and fsids for the vvols. This obviates collisions with offline vvols for new create commands and allow presentation of these vvols to the user for, e.g., mounting and destroying operations. The aggregate 900 maintains a list of raidtype information for all vvols and a list of all contained vvols that are mounted. A mounted vvol has access to its own raid information and has a pointer to the aggregate in which it resides. When loading the vvol, the storage operating system 200 accesses the filesystem file 940 (container file) within the illustrative hidden metadata root directory 930 to select the fsid of that vvol. The storage operating system then loads blocks 1 and 2 of the wafl/container file 940, which blocks comprise the volinfo block 952 for the vvol. The volinfo block is loaded in memory (in core) and includes block pointers to all other files within the vvol, including the block allocation map files.

Advantageously, the extended file system layout assembles a group of disks into an aggregate having a large, underlying storage space and flexibly allocates that space among the vvols. To that extent, the vvols have behaviors that are similar to those of qtrees, including access to all free block space within the aggregate without space boundary limitations. Sizing of a vvol is flexible, avoiding partitioning of storage space and any resulting problems. The present invention provides substantial performance advantages of a naïve nested volumes implementation, particularly as optimized for low-latency read performance, while allowing optimizations for background writing operations.

Specifically, the aggregate provides a global storage space that substantially simplifies storage management of the free block space through the use of a single pool of storage (disk) resources. Since all vvols share the disks, a "hot" vvol, i.e., a vvol that is more heavily utilized than other vvols, can benefit from all of the disks. When changes occur within a vvol, all free space of the aggregate is available to make write allocation more efficient. For example, when write allocating file data in a vvol, a write allocator 282 of the file system 280 selects free blocks for files of the vvol, with those selected blocks conveniently located anywhere within the aggregate. Moreover, because a vvol is a logical volume in a file, dirty blocks that are freed within the vvol by the write allocator 282 during write allocation may be returned to the aggregate, where they can be used by other vvols.

While there has been shown and described illustrative embodiments of a novel file system layout that apportions an underlying physical volume into a plurality of vvols of a storage system, it is to be understood that various other adaptations and modifications may be made within the spirit and scope of the invention. For example, rather than inserting only pvbn block pointers in indirect (e.g., level 1) blocks in a buffer tree of a file, the present invention contemplates alternatively inserting pvbn, wbn pairs in those indirect blocks in accordance with a "dual-vbn" embodiment. For such a dual-vbn embodiment, the number of block pointer entries per indirect block is 510 (rather than 1024), resulting in changes to the sizes of files at given levels (e.g., the 64 kB-64 MB range changes to 32 kB-16320 kB).

The use of pvbns as block pointers in the indirect blocks provides generally all of the advantages of having pvbns instead of vvbns such as, e.g., efficiencies in the read paths when accessing data, while the use of wbn block pointers provides efficient access to required metadata, such as per-volume block allocation information. That is, when freeing a block of a file, the parent indirect block in the file contains readily available wbn block pointers, which avoids the latency associated with accessing the owner map to perform pvbn-to-wbn translations; accordingly, the owner map is not needed in the dual vbn embodiment. Yet, on the read path, the pvbn is available. A disadvantage of this dual vbn variant is the increased size of indirection data (metadata) stored in each file.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system adapted to provide a file system layout of a storage system, the system comprising:
an aggregate configured with one or more groups of disks of the storage system, the aggregate having a physical volume block number (pvbn) space defining a global storage space of blocks provided by the disks, the global storage space substantially simplifying storage management of free blocks through use of a single pool of disks; and
a plurality of virtual volumes (vvols) contained within the aggregate, each vvol containing a file system and one or more files organized as buffer trees, the buffer trees utilizing pvbns as block pointers to facilitate efficient read performance on read paths of the files contained in the vvol.

2. The system of claim 1 wherein the buffer trees further utilize virtual volume block numbers (vvbns), in addition to the pvbns, as pvbn, vvbn block pointer pairs, wherein the vvbns provide efficient access to per-volume block allocation metadata information.

3. The system of claim 1 wherein the aggregate maintains block allocation structures for the aggregate within the pvbn space and wherein each vvol has a virtual volume block number (vvbn) space adapted to maintain block allocation structures for the vvol.

4. The system of claim 3 wherein the block allocation structures comprise an active map, a summary map and a space map.

5. The system of claim 3 further comprising a hidden metadata root directory of the aggregate.

6. The system of claim 5 wherein each subdirectory contains a storage label file.

7. The system of claim 6 wherein the storage label file contains information about the vvol.

8. The system of claim 6 wherein the information about the vvol includes a name of the vvol, whether the vvol is online and identity and state information of the vvol.

9. The system of claim 7 wherein the filesystem file further comprises a container file associated with each vvol, the container file embodied as a file in the aggregate and containing all blocks used by a vvol.

10. The system of claim 9 wherein a block that is freed (a free block) in the container file is returned to the global storage space of the aggregate.

11. The system of claim 9 wherein the container file comprises indirect blocks configured as a container map that provides a forward mapping of vvbns of a vvol to pvbns of the aggregate.

12. The system of claim 11 wherein the container map further comprises one or more block pointers from one or more file block number (fbn) locations within the container file to pvbn locations on disk.

13. The system of claim 11 wherein the indirect blocks contain pvbns in aggregate.

14. The system of claim 5 wherein each subdirectory has a filesystem file comprising block pointers that reference various file systems embodied as the vvols.

15. The system of claim 5 wherein the hidden metadata root directory of the aggregate contains a subdirectory for each vvol.

16. The system of claim 1 further comprising an owner map associated with the aggregate, the owner map comprising a data structure having one or more entries, each entry providing a backward mapping between a pvbn of the aggregate and a virtual volume block number (vvbn) of a vvol.

17. The system of claim 16 wherein each entry of the owner map, indexed by a pvbn, comprises a vvol identifier (vvid) and a vvbn such that, for a block in the aggregate, the entry indicates which vvol owns the block and which vvbn it maps to in the vvbn space.

18. The system of claim 1 wherein the one or more groups of disks are RAID groups.

19. The system of claim 1 wherein the aggregate is represented by at least one RAID plex, wherein each RAID plex further comprises a plurality of disks.

20. The system of claim 1 wherein the sum of a storage space consumed by the one or more vvols is physically less than or equal to a size of an overall physical volume.

21. The system of claim 20 wherein the overall physical volume comprises the aggregate.

22. Apparatus for providing a file system layout of a storage system, the apparatus comprising:
means for assembling one or more groups of disks of the storage system into an aggregate, the aggregate having a physical volume block number (pvbn) space defining a global storage space provided by the disks;
means for apportioning the aggregate into one or more virtual volumes (vvols) of the storage system, each vvol having a file system, a virtual volume block number (vvbn) space and containing one or more files organized as buffer trees; and
means for utilizing pvbn, vvbn pairs as block pointers within the buffer trees, wherein the pvbns facilitate efficient read performance on read paths of the files contained in each vvol and the vvbns provide efficient access to per-volume block allocation metadata information.

23. A system adapted to apportion an underlying physical volume into one or more virtual volumes (vvols) of a storage system, the system comprising:
one or more disks comprising an aggregate of the storage system, the aggregate having its own physical volume block number (pvbn) space; and
each vvol having a file system and its own virtual volume block number (vvbn) space.

24. A system adapted to simplify management of an aggregate, the system comprising:
a user interface (UI) including a command set; and
wherein the command set includes a command for growing a virtual volume (vvol) file using available disk space in the aggregate, where each vvol has a file system and a plurality of files, luns, directories or qtress.

25. The system of claim 24 wherein growing comprises increasing a number of blocks the vvol is permitted to utilize.

26. The system of claim 24 wherein growing comprises increasing a volume level space reservation.

27. The system of claim 24 wherein the command set includes a demand for reducing a size of the vvol and returning any free blocks to the aggregate.

28. The system of claim 27 wherein reducing comprises decreasing a number of blocks the vvol is permitted to utilize.

29. A system adapted to provide a file system layout of a storage system, the system comprising:
an aggregate configured with one or more groups of disks of the storage system, the aggregate having a physical volume block number (pvbn) space defining a global storage space of blocks provided by the disks; and
one or more virtual volumes (vvols) contained within the aggregate, each one of the one or more vvols containing a file system and one or more files organized as buffer trees.

30. The system of claim 29 wherein the aggregate is represented by at least one RAID plex, wherein each RAID plex further comprises a plurality of disks.

31. The system of claim 29 wherein the sum of a storage space consumed by the one or more vvols is physically less than or equal to a size of an overall physical volume.

32. The system of claim 31 wherein the overall physical volume comprises the aggregate.

33. The system of claim 29 wherein the global storage space manages free blocks through use of a single pool of disks.

34. The system of claim 33 wherein a block that is freed in the container file is returned to the global storage space of the aggregate.

35. The system of claim 33 wherein the container file comprises indirect blocks configured as a container map that provides a forward mapping of vvbns of the one or more vvols to the one or more pvbns of the aggregate.

36. The system of claim 35 wherein the container map further comprises one or more block pointers from one or more file block number (fbn) locations within the container file to the one or more pvbn locations on disk.

37. The system of claim 35 wherein the indirect blocks contain one or more pvbns in the aggregate.

38. The system of claim 29 wherein the buffer trees comprise one or more pvbns.

39. The system of claim 38 wherein the one or more pvbns act as block pointers to the files contained in the vvol.

40. The system of claim 29 wherein the buffer trees further utilize virtual volume block numbers (vvbns), in addition to the one or more pvbns, as pvbn, vvbn block pointer pairs, wherein the vvbns provide access to per-volume block allocation metadata information.

41. The system of claim 29 wherein the aggregate maintains block allocation structures for the aggregate within the one or more pvbn spaces and wherein each of the one or more vvols has a virtual volume block number (vvbn) space adapted to maintain block allocation structures for the one or more vvols.

42. The system of claim 41 wherein the block allocation structures for the one or more vvols comprise an active map, a summary map and a space map.

43. The system of claim 41 wherein the block allocation structures for the aggregate comprise an active map, a summary map and a space map.

44. The system of claim 41 further comprising a hidden metadata root directory of the aggregate.

45. The system of claim 44 wherein the hidden metadata root directory of the aggregate contains a subdirectory for each of the one or more vvols.

46. The system of claim 45 wherein each subdirectory contains a storage label file.

47. The system of claim 46 wherein the storage label file contains information about the one or more vvols.

48. The system of claim 45 wherein each subdirectory has a filesystem file comprising block pointers that reference various file systems embodied as the one or more vvols.

49. The system of claim 48 wherein the filesystem file further comprises a container file associated with each of the one or more vvols, the container file embodied as a file in the aggregate and containing blocks used by one of the one or more vvols.

50. The system of claim 29 further comprising an owner map associated with the aggregate, the owner map comprising a data structure having one or more entries, each entry providing a backward mapping between the one or more pvbns of the aggregate and a virtual volume block number (vvbn) of the one or more vvols.

51. The system of claim 50 wherein each entry of the owner map, indexed by one of the one or more pvbns, comprises a vvol identifier (vvid) and a vvbn such that, for a block in the aggregate, the entry indicates which one of the one or more vvols owns the block and which vvbn it maps to in the vvbn space.

52. The system of claim 29 wherein the one or more groups of disks are RAID groups.

53. A system adapted to provide a file system layout of a storage system, the system comprising:
an aggregate configured with one or more groups of storage devices of the storage system, the aggregate having a physical volume block number (pvbn) space defining a global storage space of blocks provided by the storage devices, the global storage space substantially simplifying storage management of free blocks through use of a single pool of storage devices; and one or more virtual volumes (vvols) contained within the aggregate, each vvol containing a file system and one or more files organized as buffer trees, the buffer trees utilizing pvbns as block pointers to facilitate efficient read performance on read paths of the files contained in the vvol.

54. A storage system, comprising:

an aggregate having a plurality of virtual volumes, each virtual volume having a container that includes a file system and blocks used by the virtual volume;

a plurality of storage devices addressed by a physical volume block number (pvbn) space to provide a global storage space of the aggregate common to the plurality of virtual volumes; and a map to translate a block number of the container of the virtual volume into a pvbn of the global storage space.

55. A system, comprising:

a plurality of storage devices;

a single server connected to the plurality of storage devices, wherein the server has an aggregate that defines a global storage space formed from the plurality of storage devices, wherein the aggregate controls a plurality of free blocks;

a plurality of virtual volumes stored within the aggregate, where each virtual volume contains a file system and a plurality of files, directories, luns, or qtrees; and the file system of each first virtual volume is configured to generate a snapshot of its respective virtual volume.

56. The system of claim 55, wherein the file system of each virtual volume is further configured to add blocks as necessary into its respective virtual volume.

57. A method for providing a file system layout of a storage system, comprising:

assembling one or more groups of disks of the storage system into an aggregate, the aggregate having a physical volume block number (pvbn) space defining a global storage space provided by the disks;

apportioning the aggregate into one or more virtual volumes (vvols) of the storage system, each vvol having a file system, a virtual volume block number (vvbn) space and containing one or more files organized as buffer trees; and utilizing pvbn, vvbn pairs as block pointers within the buffer trees, wherein the pvbns facilitate efficient read performance on read paths of the files contained in each vvol and the vvbns provide efficient access to per-volume block allocation metadata information.

58. The method of claim 57 wherein the vvbn space of each vvol facilitates efficient data management operations at the vvol.

59. The method of claim 58 further comprising: linking the vvbn space for each vvol to the pvbn space of the aggregate; and flexibly allocating the global storage space of the aggregate among each vvol.

60. The method of claim 59 wherein utilizing comprises using the pvbns as block pointers to avoid latency associated with translations from vvbns-to-pvbns when servicing file system requests at the storage system.

61. The method of claim 60 further comprising maintaining block allocation structures within the vvbn space of each vvol.

62. The method of claim 61 wherein maintaining comprises sizing the block allocation structures to each vvol to allow operations that manage data served by the storage system to efficiently work over the vvol.

63. The method of claim 57 wherein the one or more groups of disks are RAID groups.

64. A method for providing a file system layout of a storage system, comprising:

assembling one or more groups of disks of the storage system into an aggregate, the aggregate having a physical volume block number (pvbn) space defining a global storage space provided by the disks; and apportioning the aggregate into one or more virtual volumes (vvols) of the storage system, each one of the one or more vvols having a file system, a virtual volume block number (vvbn) space and containing one or more files organized as buffer trees.

65. The method of claim 64 wherein the one or more groups of disks are RAID groups.

66. The method of claim 64 wherein the buffer trees comprise one or more pvbns.

67. The method of claim 66 wherein the step of using the one or more pvbns as block pointers when servicing file system requests at the storage system comprise using the one or more pvbns.

68. The method of claim 67 further comprising maintaining block allocation structures within the vvbn space of each of the one or more vvols.

69. The method of claim 68 wherein the step of maintaining comprises sizing the block allocation structures to each of the one or more vvols.

70. The method of claim 68 wherein each of the one or more vvols comprises allowing operations that manage data served by the storage system to work over the one or more vvols.

71. The method of claim 64 further comprising:

linking the vvbn space for each of the one or more vvols to the one or more pvbn spaces of the aggregate; and flexibly allocating the global storage space of the aggregate among each of the one or more vvols.

72. A computer readable storage medium containing executable program instructions for providing a file system layout of a storage system, the executable instructions comprising one or more program instructions for:

assembling one or more groups of disks of the storage system into an aggregate, the aggregate having a physical volume block number (pvbn) space defining a global storage space provided by the disks;

apportioning the aggregate into one or more virtual volumes (vvols) of the storage system, each vvol having a file system, a virtual volume block number (vvbn) space and containing one or more files organized as buffer trees; and utilizing pvbn, vvbn pairs as block pointers within the buffer trees, wherein the pvbns facilitate efficient read performance on read paths of the files contained in each vvol and the vvbns provide efficient access to per-volume block allocation metadata information.

73. A computer-implemented storage system, comprising:

an aggregate having a plurality of virtual volumes, each virtual volume having a container that includes a file system and blocks used by the virtual volume;

a plurality of disks addressed by a physical volume block number (pvbn) space to provide a global storage space of the aggregate common to the plurality of virtual volumes; and a map to translate a block number of the container of the virtual volume into a pvbn of the global storage space.

74. The computer-implemented storage system of claim 73, wherein each virtual volume contains one or more files, directories, luns, or qtrees.

75. The computer-implemented storage system of claim 74, wherein the container is a buffer tree, where the buffer tree is an internal representation of blocks of the container, the directory, the lun, or the qtree, and the buffer tree is loaded into memory and maintained by a write-anywhere file system.

76. The computer-implemented storage system of claim 73, further comprising:
a virtual volume block number (vvbn) space adapted to maintain block allocation for the virtual volume.

77. The computer-implemented storage system of claim 73, further comprising:
a data structure with one or more entries, the data structure adapted to translate the pvbn to a virtual volume block number (vvbn) to provide access to per-volume allocation metadata information.

78. The computer-implemented storage system of claim 73, wherein the map comprises one or more lowest-level indirect blocks each storing the pvbn, with each indirect block having a pointer to a block storing the block number of the container.

79. The computer-implemented storage system of claim 73, wherein each virtual volume further comprises a file system.

80. The computer-implemented storage system of claim 79, further comprises the file system is configured to add one or more blocks from the global storage space to add new or changed data to the virtual volume.

81. The computer-implemented storage system of claim 73, further comprising one or more new disks added to the plurality of disks to provide a larger global storage space for the plurality of virtual volumes to select blocks, and wherein the larger global storage space is addressed by a larger pvbn space.

82. The computer-implemented storage system of claim 73, wherein the plurality of disks are grouped into one or more RAID groups.

83. The computer-implemented storage system of claim 73, further comprising:
a persistent consistency point image (PCPI) operation to generate a PCPI of the virtual volume, wherein the PCPI generated is less than the global storage space of the aggregate.

84. A computer-implemented method for operating a storage system, comprising:
establishing an aggregate having a plurality of virtual volumes, each virtual volume having a container that includes a file system and blocks used by the virtual volume;
addressing a plurality of disks using a physical volume block number (pvbn) space to provide a global storage space of the aggregate common to the plurality of virtual volumes; and
translating a block number of the container of the virtual volume into a pvbn of the global storage space.

85. The method of claim 84, wherein each virtual volume contains one or more files, directories, luns, or qtrees.

86. The method of claim 84, further comprising:
providing a virtual volume block number (vvbn) space to maintain block allocation for the virtual volume.

87. The method of claim 84, further comprising:
translating the pvbn to a virtual volume block number (vvbn) to provide access to per-volume allocation metadata information.

88. The method of claim 84, wherein the map comprises one or more lowest-level indirect blocks each storing the pvbn, with each indirect block having a pointer to a block storing the block number of the container.

89. The method of claim 84, further comprises:
configuring each virtual volume with a file system; and
configuring the file system to return a free block, where the virtual volume previously determines the block to be free, to the global storage space of the aggregate.

90. The method of claim 84, further comprising:
configuring each virtual volume with a file system; and
configuring the file system to add one or more blocks from the global storage space to add new or changed data to the virtual volume.

91. The method of claim 84, further comprising:
adding one or more new disks to the plurality of disks to provide a larger global storage space for the plurality of virtual volumes to select blocks, and wherein the larger global storage space is addressed by a larger pvbn space.

92. The method of claim 84, further comprising:
generating a persistent consistency point image (PCPI) of the virtual volume, wherein the PCPI generated is less than the global storage space of the aggregate.

93. A computer-implemented storage system, comprising:
an aggregate having a plurality of virtual volumes, each virtual volume having a container file that contains blocks used by the virtual volume, a file system, and one or more files, directories, luns, or qtrees;
a plurality of disks addressed by a physical volume block number (pvbn) space to provide a global storage space of the aggregate common to the plurality of virtual volumes; and
the file system of each virtual volume configured to add blocks as necessary into the virtual volume, wherein the file system maintains a virtual block number (vvbn) space.

* * * * *

UNITED STATES PATENT AND TRADEMARK OFFICE
CERTIFICATE OF CORRECTION

PATENT NO. : 7,409,494 B2 Page 1 of 1
APPLICATION NO. : 10/836817
DATED : August 5, 2008
INVENTOR(S) : John K. Edwards et al.

It is certified that error appears in the above-identified patent and that said Letters Patent is hereby corrected as shown below:

Column 1:
Line 8: delete "112056-0154" substitute -- 10/836,090 --

Column 6:
Line 19: delete "wbn" substitute -- vvbn --
Line 38: delete "wbn" substitute -- vvbn --
Line 39: delete "wbn" substitute -- vvbn --

Column 19:
Line 17: delete "wbn" substitute -- vvbn --
Line 26: delete "wbn" substitute -- vvbn --
Line 30: delete "wbn" substitute -- vvbn --
Line 32: delete "wbn" substitute -- vvbn --

Signed and Sealed this

Second Day of December, 2008

JON W. DUDAS
*Director of the United States Patent and Trademark Office*